US007554969B2

(12) United States Patent
Bialik

(10) Patent No.: US 7,554,969 B2
(45) Date of Patent: Jun. 30, 2009

(54) SYSTEMS AND METHODS FOR ENCODING AND DECODING SPEECH FOR LOSSY TRANSMISSION NETWORKS

(75) Inventor: Leon Bialik, Tel Aviv (IL)

(73) Assignee: AudioCodes, Ltd., Lod (IL)

( * ) Notice: Subject to any disclaimer, the term of this patent is extended or adjusted under 35 U.S.C. 154(b) by 442 days.

(21) Appl. No.: 10/122,076

(22) Filed: Apr. 15, 2002

(65) Prior Publication Data

US 2002/0159472 A1 Oct. 31, 2002

Related U.S. Application Data

(63) Continuation of application No. 09/073,687, filed on May 6, 1998, now Pat. No. 6,389,006.

(30) Foreign Application Priority Data

May 6, 1997 (IL) ..................................... 120788

(51) Int. Cl.
*H04L 12/66* (2006.01)

(52) U.S. Cl. ...................................... 370/352; 704/207

(58) Field of Classification Search ................. 370/442, 370/389, 352, 229, 252, 392, 470, 471, 474; 704/207, 208, 214, 220, 221, 230, 223, 205, 704/227, 216
See application file for complete search history.

(56) References Cited

U.S. PATENT DOCUMENTS 4,716,592 A * 12/1987 Ozawa et al. ............... 704/216
4,969,192 A 11/1990 Chen et al.
5,189,701 A * 2/1993 Jain ........................... 704/207
5,293,449 A * 3/1994 Tzeng ......................... 704/223
5,307,441 A 4/1994 Tzeng
5,384,891 A 1/1995 Asakawa et al.
5,457,783 A 10/1995 Chhatwal
5,544,278 A 8/1996 Bialik et al.
5,596,676 A * 1/1997 Swaminathan et al. ...... 704/208
5,600,754 A * 2/1997 Gardner et al. .............. 704/221
5,630,011 A * 5/1997 Lim et al. ................... 704/205
5,699,485 A 12/1997 Shoham
5,732,389 A * 3/1998 Kroon et al. ................ 704/223
5,734,789 A * 3/1998 Swaminathan et al. ...... 704/206
5,765,127 A * 6/1998 Nishiguchi et al. .......... 704/208
5,774,837 A * 6/1998 Yeldener et al. ............ 704/208
5,774,846 A 6/1998 Morii
5,778,335 A 7/1998 Ubale et al.
5,890,108 A 3/1999 Yeldener (Continued)

OTHER PUBLICATIONS

Peter Kroon et al., "A Class Analysis by Synthesis Predictive Coders for Hihg Quality Speech Coding at Rates Between 4.8 annd 16 kbits/s",IEEE Journal on Selected Areas in Communications, Feb. 1998, pp. 353-363, vol. 6, No. 2.

(Continued)

*Primary Examiner*—Brian D Nguyen
(74) *Attorney, Agent, or Firm*—EMPK & Shiloh, L.L.P.

(57) ABSTRACT

A voice encoder which utilizes future data, such as the lookahead data typically available for linear predictive coding (LPC), to partially encode a future packet and to send the partial encoding as part of the current packet. A decoder utilizes the partial encoding of the previous packet to decode the current packet if the latter did not arrive properly.

3 Claims, 7 Drawing Sheets

U.S. PATENT DOCUMENTS 5,950,155 A * 9/1999 Nishiguchi .................. 704/230
6,018,706 A 1/2000 Huang et al.
6,104,993 A * 8/2000 Ashley ....................... 704/227
6,389,006 B1 5/2002 Bialik

OTHER PUBLICATIONS

Furui, Digital Speech Processing, Synthesis and Recognition, 1989, Marcel Dekker Inc., New York.

* cited by examiner

SYSTEMS AND METHODS FOR ENCODING AND DECODING SPEECH FOR LOSSY TRANSMISSION NETWORKS

CROSS REFERENCE TO RELATED APPLICATIONS

This application is a continuation application of U.S. patent application, Ser. No. 09/073,687, filed May 6, 1998 now U.S. Pat. No. 6,389,006, which claims priority from Israeli application No. 120788, filed May 6, 1997, and incorporated in its entirety by reference herein.

FIELD OF THE INVENTION

The present relates to systems and methods for transmitting speech and voice over a packet data network.

BACKGROUND OF THE INVENTION

Packet data networks send packets of data from one computer to another. They can be configured as local area networks (LANs) or as wide area networks (WANs). One example of the latter is the Internet.

Each packet of data is separately addressed and sent by the transmitting computer. The network routes each packet separately and thus, each packet might take a different amount of time to arrive at the destination. When the data being sent is part of a file which will not be touched until it has completely arrived, the varying delays is of no concern.

However, files and email messages are not the only type of data sent on packet data networks. Recently, it has become possible to also send real-time voice signals, thereby providing the ability to have voice conversations over the networks. For voice conversations, the voice data packets are played shortly after they are received which becomes difficult if a data packet is significantly delayed. For voice conversations, a packet which arrives very late is equivalent to being lost. On the Internet, 5%-25% of the packets are lost and, as a result, Internet phone conversations are often very choppy.

One solution is to increase the delay between receiving a packet and playing it, thereby allowing late packets to be received. However, if the delay is too large, the phone conversation becomes awkward.

Standards for compressing voice signals exist which define how to compress (or encode) and decompress (e.g. decode) the voice signal and how to create the packet of compressed data. The standards also define how to function in the presence of packet loss.

Most vocoders (systems which encode and decode voice signals) utilize already stored information regarding previous voice packets to interpolate what the lost packet might sound like. For example, FIGS. 1A, 1B and 1C illustrate a typical vocoder and its operation, where FIG. 1A illustrates the encoder 10, FIG. 1B illustrates the operation of a pitch processor and FIG. 1C illustrates the decoder 12. Examples of many commonly utilized methods are described in the book by Sadaoki Furui, *Digital Speech Processing, Synthesis and Recognition,* Marcel Dekker Inc., New York, N.Y., 1989. This book and the articles in its bibliography are incorporated herein by reference.

The encoder 10 receives a digitized frame of speech data and includes a short term component analyzer 14, such as a linear prediction coding (LPC) processor, a long term component analyzer 16, such as a pitch processor, a history buffer 18, a remnant excitation processor 20 and a packet creator 17. The LPC processor 14 determines the spectral coefficients (e.g. the LPC coefficients) which define the spectral envelope of each frame and, using the spectral coefficients, creates a noise shaping filter with which to filter the frame. Thus, the speech signal output of the LPC processor 14, a "residual signal", is generally devoid of the spectral information of the frame. An LPC converter 19 converts the LPC coefficients to a more transmittable form, known as "LSP" coefficients.

The pitch processor 16 analyses the residual signal which includes therein periodic spikes which define the pitch of the signal. To determine the pitch, pitch processor 16 correlates the residual signal of the current frame to residual signals of previous frames produced as described hereinbelow with respect to FIG. 1B. The offset at which the correlation signal has the highest value is the pitch value for the frame. In other words, the pitch value is the number of samples prior to the start of the current frame at which the current frame best matches previous frame data. Pitch processor 16 then determines a long-term prediction which models the fine structure in the spectra of the speech in a subframe, typically of 40-80 samples. The resultant modeled waveform is subtracted from the signal in the subframe thereby producing a "remnant" signal which is provided to remnant excitation processor 20 and is stored in the history buffer 18.

FIG. 1B schematically illustrates the operation of pitch processor 16 where the residual signal of the current frame is shown to the right of a line 11 and data in the history buffer is shown to its left. Pitch processor 16 takes a window 13 of data of the same length as the current frame and which begins P samples before line 11, where P is the current pitch value to be tested and provides window 13 to an LPC synthesizer 15.

If the pitch value P is less than the size of a frame, there will not be enough history data to fill a frame. In this case, pitch processor 16 creates window 13 by repeating the data from the history buffer until the window is full.

Synthesizer 15 then synthesizes the residual signal associated with the window 13 of data by utilizing the LPC coefficients. Typically, synthesizer 15 also includes a format perceptual weighting filter which aids in the synthesis operation. The synthesized signal, shown at 21, is then compared to the current frame and the quality of the difference signal is noted. The process is repeated for a multiplicity of values of pitch P and the selected pitch P is the one whose synthesized signal is closest to the current residual signal (i.e. the one which has the smallest difference signal).

The remnant excitation processor 20 characterizes the shape of the remnant signal and the characterization is provided to packet creator 17. Packet creator 17 combines the LPC spectral coefficients, the pitch value and the remnant characterization into a packet of data and sends them to decoder 12 (FIG. 1C) which includes a packet receiver 25, a selector 22, an LSP converter 24, a history buffer 26, a summer 28, an LPC synthesizer 30 and a post-filter 32.

Packet receiver 25 receives the packet and separates the packet data into the pitch value, the remnant signal and the LSP coefficients. LSP converter 24 converts the LSP coefficients to LPC coefficients.

History buffer 26 stores previous residual signals up to the present moment and selector 22 utilizes the pitch value to select a relevant window of the data from history buffer 26. The selected window of the data is added to the remnant signal (by summer 28) and the result is stored in the history buffer 26, as a new signal. The new signal is also provided to LPC synthesis unit 30 which, using the LPC coefficients, produces a speech waveform. Post-filter 32 then distorts the waveform, also using the LPC coefficients, to reproduce the input speech signal in a way which is pleasing to the human ear.

In the G.723 vocoder standard of the International Telephone Union (ITU) remnants are interpolated in order to reproduce a lost packet. The remnant interpolation is performed in two different ways, depending on the state of the last good frame prior to the lost, or erased, frame. The state of the last good frame is checked with a voiced/unvoiced classifier.

The classifier is based on a cross-correlation maximization function. The last 120 samples of the last good frame ("vector") are cross correlated with a drift of up to three samples. The index which reaches the maximum correlation value is chosen as the interpolation index candidate. Then, the prediction gain of the best vector is tested. If its gain is more than 2 dB, the frame is declared as voiced. Otherwise, the frame is declared as unvoiced.

The classifier returns 0 for the unvoiced case and the estimated pitch value for the voiced case. If the frame was declared unvoiced, an average gain is saved. If the current frame is marked as erased and the previous frame is classified as unvoiced, the remnant signal for the current frame is generated using a uniform random number generator. The random number generator output is scaled using the previously computed gain value.

In the voiced case, the current frame is regenerated with periodic excitation having a period equal to the value provided by the classifier. If the frame erasure state continues for the next two frames, the regenerated vector is attenuated by an additional 2 dB for each frame. After three interpolated frames, the output is muted completely.

SUMMARY OF THE INVENTION

There is provided, in accordance with a preferred embodiment of the present invention, a voice encoder and decoder which attempt to minimize the effects of voice data packet loss, typically over wide area networks.

Furthermore, in accordance with a preferred embodiment of the present invention, the voice encoder utilizes future data, such as the lookahead data typically available for linear predictive coding (LPC), to partially encode a future packet and to send the partial encoding as part of the current packet. The decoder utilizes the partial encoding of the previous packet to decode the current packet if the latter did not arrive properly.

There is also provided, in accordance with a preferred embodiment of the present invention, a voice data packet which includes a first portion containing information regarding the current voice frame and a second portion containing partial information regarding the future voice frame.

BRIEF DESCRIPTION OF THE DRAWINGS

The present invention will be understood and appreciated more fully from the following detailed description taken in conjunction with the appended drawings in which:

FIG. 1A is a block diagram of an encoder, FIG. 1B is a schematic illustration of the operation of a part of the encoder of FIG. 1A and FIG. 1C is a block diagram illustration of decoder;

DETAILED DESCRIPTION OF THE PRESENT INVENTION

Figure 2:
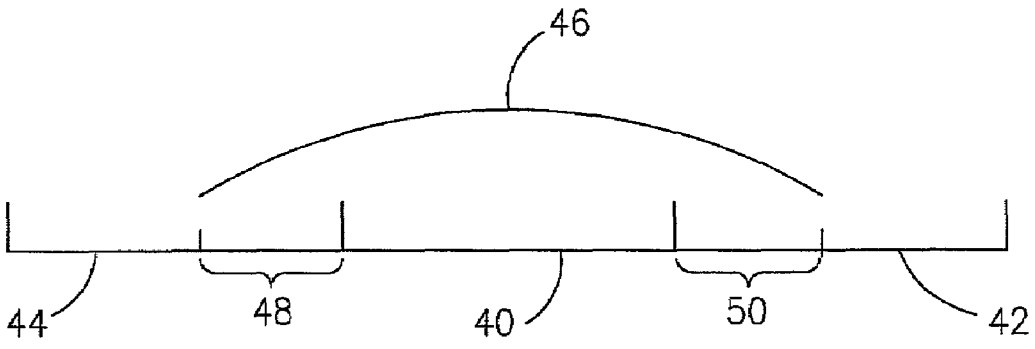
FIG. 2 is a schematic illustration of the data utilized for LPC encoding.
Figure 3:
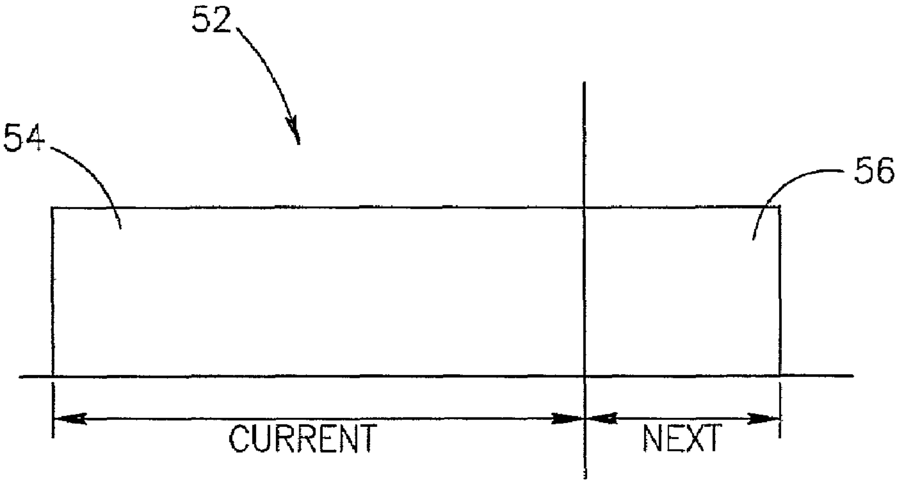
FIG. 3 is a schematic illustration of a combination packet, constructed and operative in accordance with a preferred embodiment of the present invention.
Figure 4A:
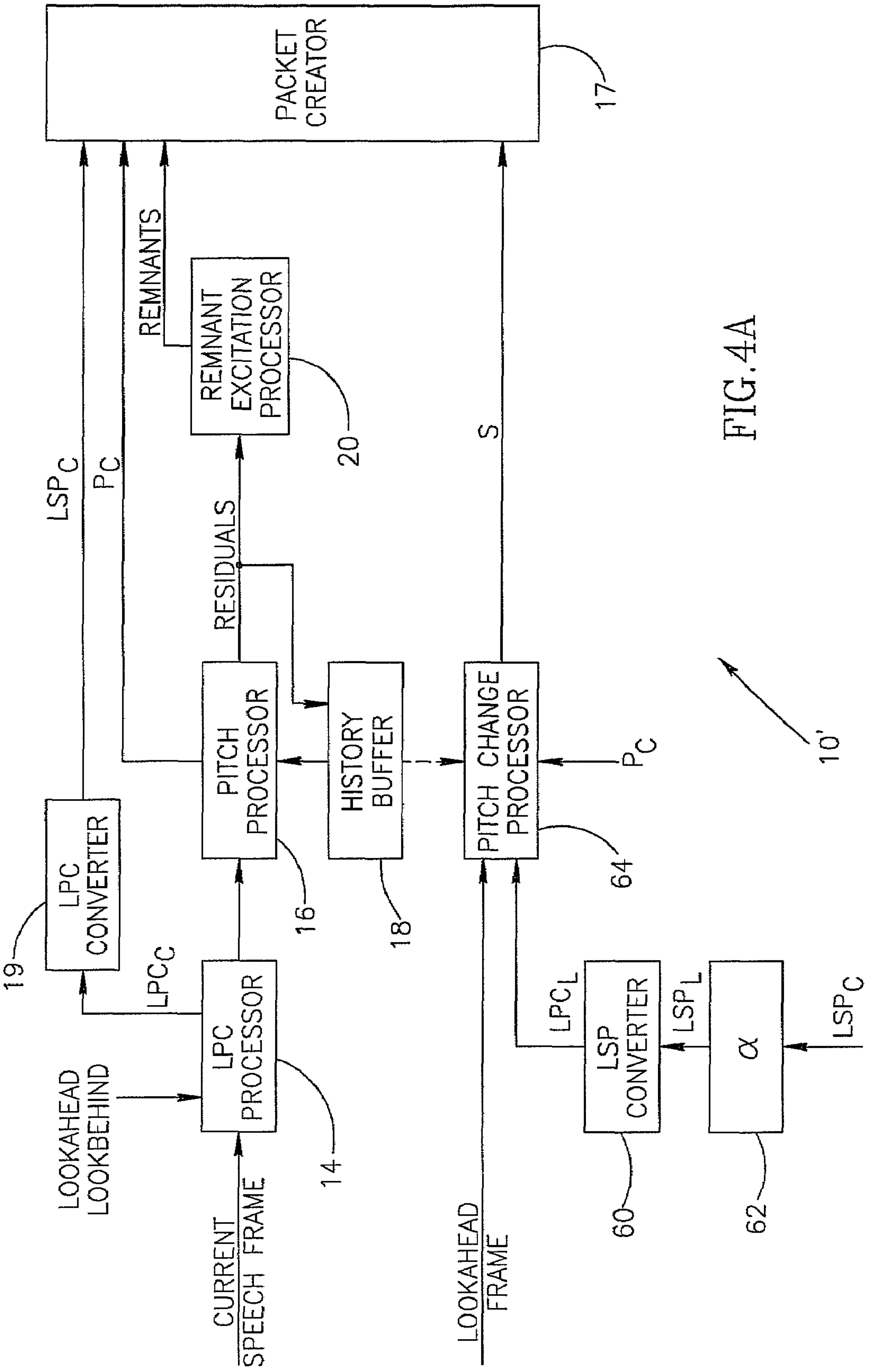
FIGS. 4A and 4B are block diagram illustrations of a voice encoder and decoder, respectively, in accordance with a preferred embodiment of the present invention.
Figure 4B:
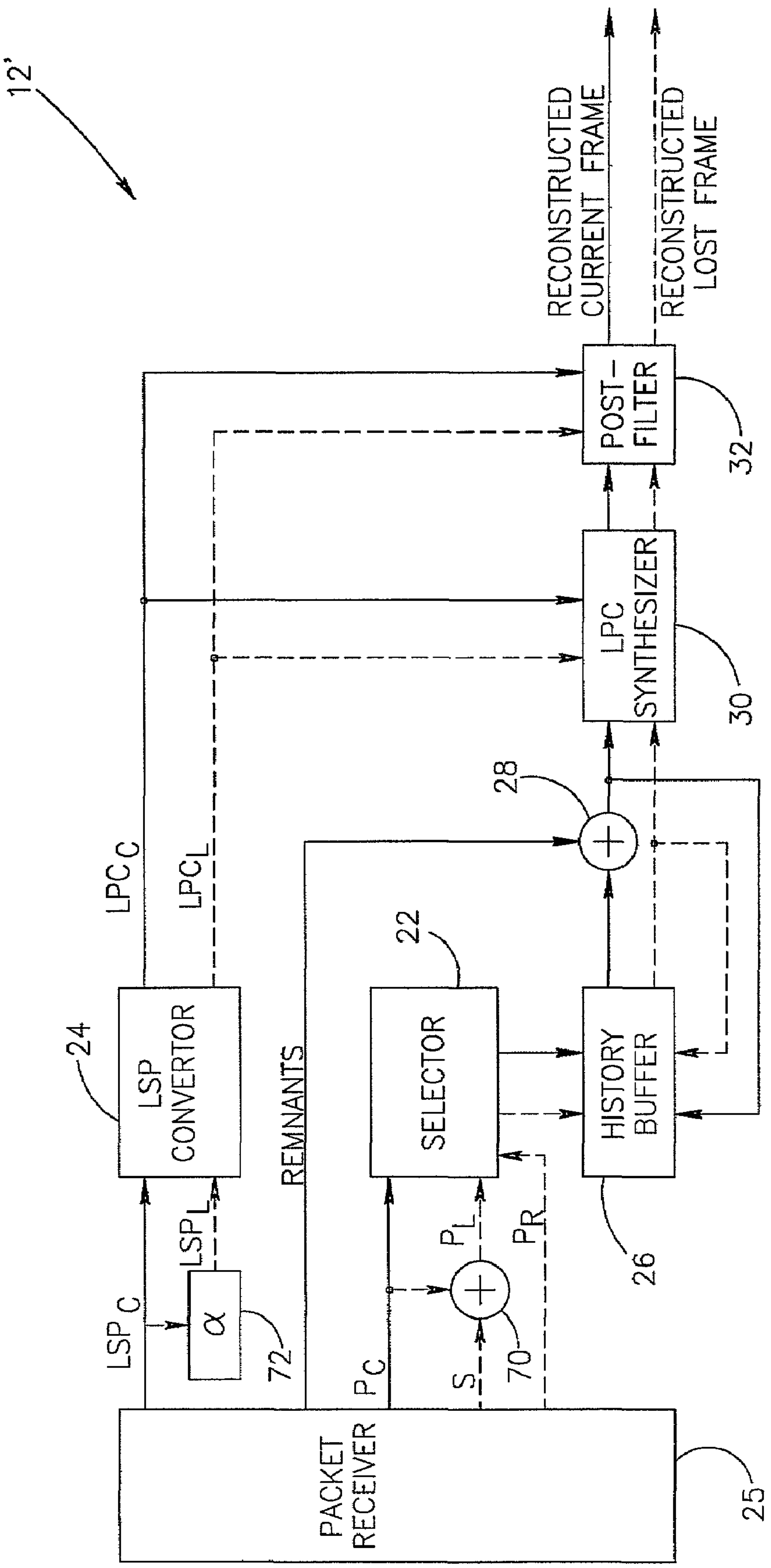
Figure 5:
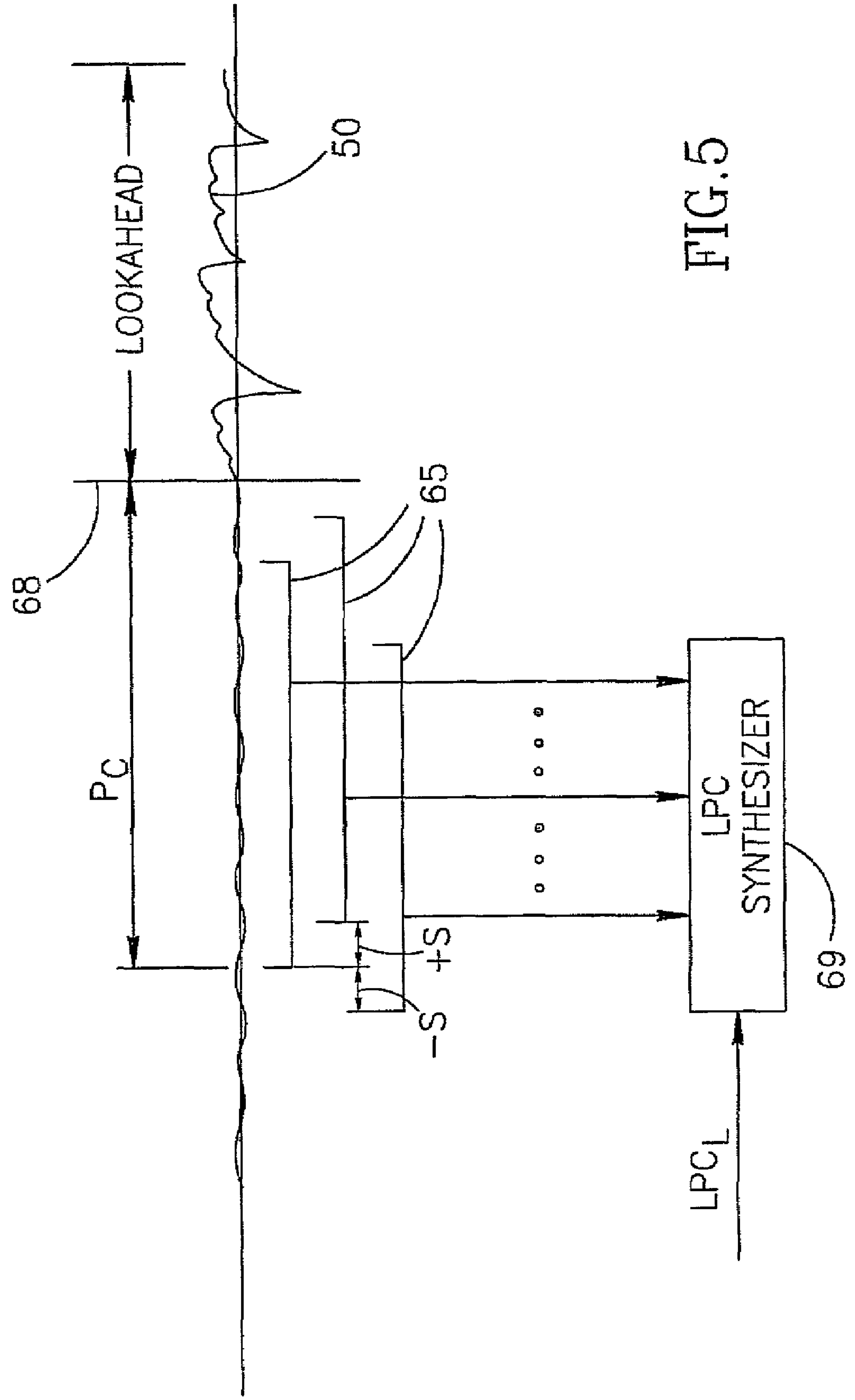
FIG. 5 is a schematic illustration, similar to FIG. 1B, of the operation of one part of the encoder of FIG. 4A.

Reference is now made to FIGS. 2, 3, 4A, 4B and 5 which illustrate the vocoder of the present invention. FIG. 2 illustrates the data which is utilized for LPC encoding, FIG. 3 illustrates the packet which is transmitted, FIG. 4A illustrates the encoder, FIG. 4B illustrates the decoder and FIG. 5 illustrates how the data is used for future frame encoding.

It is noted that the short term analysis, such as the LPC encoding performed by LPC processor 14, typically utilizes lookahead and lookbehind data. This is illustrated in FIG. 2 which shows three frames, the current frame 40, the future frame 42 and the previous frame 44. The data utilized for the short term analysis is indicated by arc 46 and includes all of current frame 40, a lookbehind portion 48 of previous frame 44 and a lookahead portion 50 of future frame 42. The sizes of portions 48 and 50 are typically 30-50% of the size of frames 40, 42 and 44 and is set for a specific vocoder.

Applicant has realized that lookahead portion 50 can be utilized to provide at least partial information regarding future frame 42 to help the decoder reconstruct future frame 42, if the packet containing future frame 42 is improperly received (i.e. lost or corrupted).

In accordance with a preferred embodiment of the present invention and as shown in FIG. 3, a voice data packet 52 comprises a current frame portion 54 having a compressed version of current frame 40 and a future frame portion 56 having some data regarding future frame 42 based on lookahead portion 50. It is noted that future frame portion 56 is considerably smaller than current frame portion 54; typically, future frame portion 56 is of the order of 2-4 bits. The size of future frame portion 56 can be preset or, if there is a mechanism to determine the extent of packet loss, the size can be adaptive, increasing when there is greater packet loss and decreasing when the transmission is more reliable.

In the example provided hereinbelow, the future frame portion 56 stores a change in the pitch from current frame 40 to lookahead portion 50 assuming that the LPC coefficients have decayed slightly. Thus, all that has to be transmitted is just the change in the pitch; the LPC coefficients are present from current frame 40 as is the base pitch. It will be appreciated that the present invention incorporates all types of future frame portions 56 and the vocoders which encode and decode them.

FIGS. 4A and 4B illustrate an exemplary version of an updated encoder 10' and decoder 12', respectively, for a future frame portion 56 storing a change in pitch. Similar reference numerals refer to similar elements.

Figure 1A:
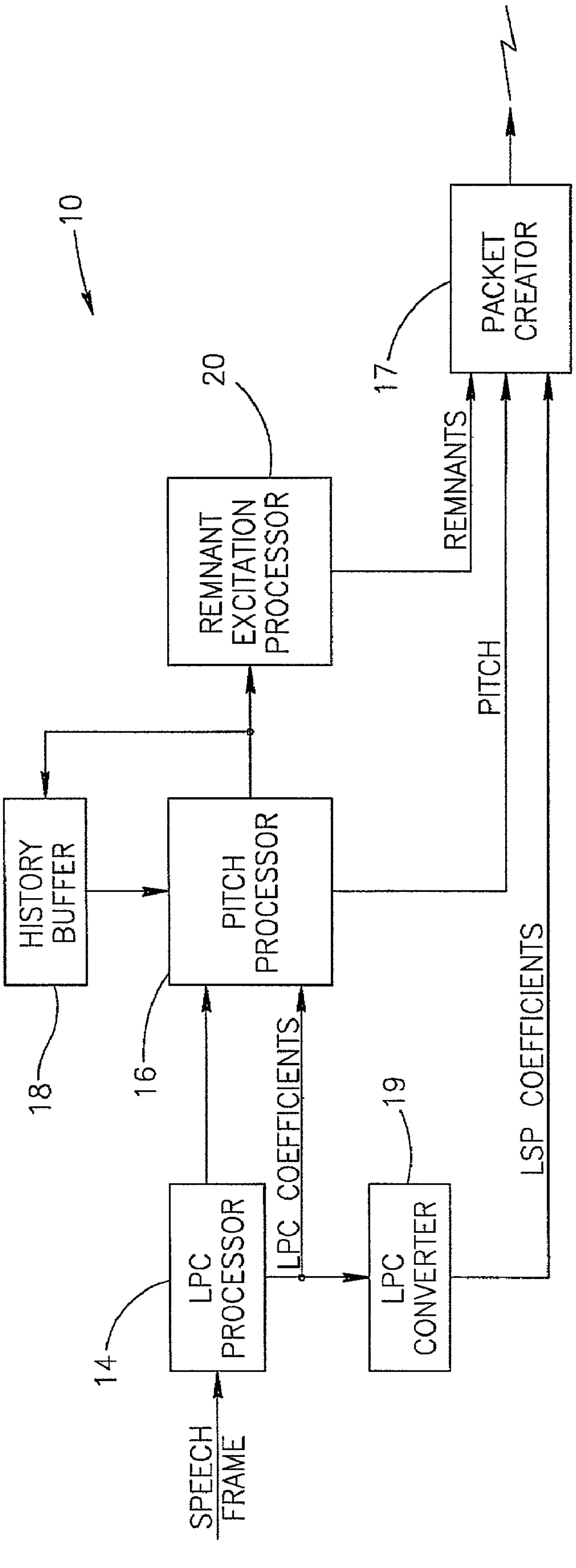
FIG.1A PRIOR ART
FIGS. 1A, 1B and 1C are of a prior art vocoder and its operation, where
Figure 1B:
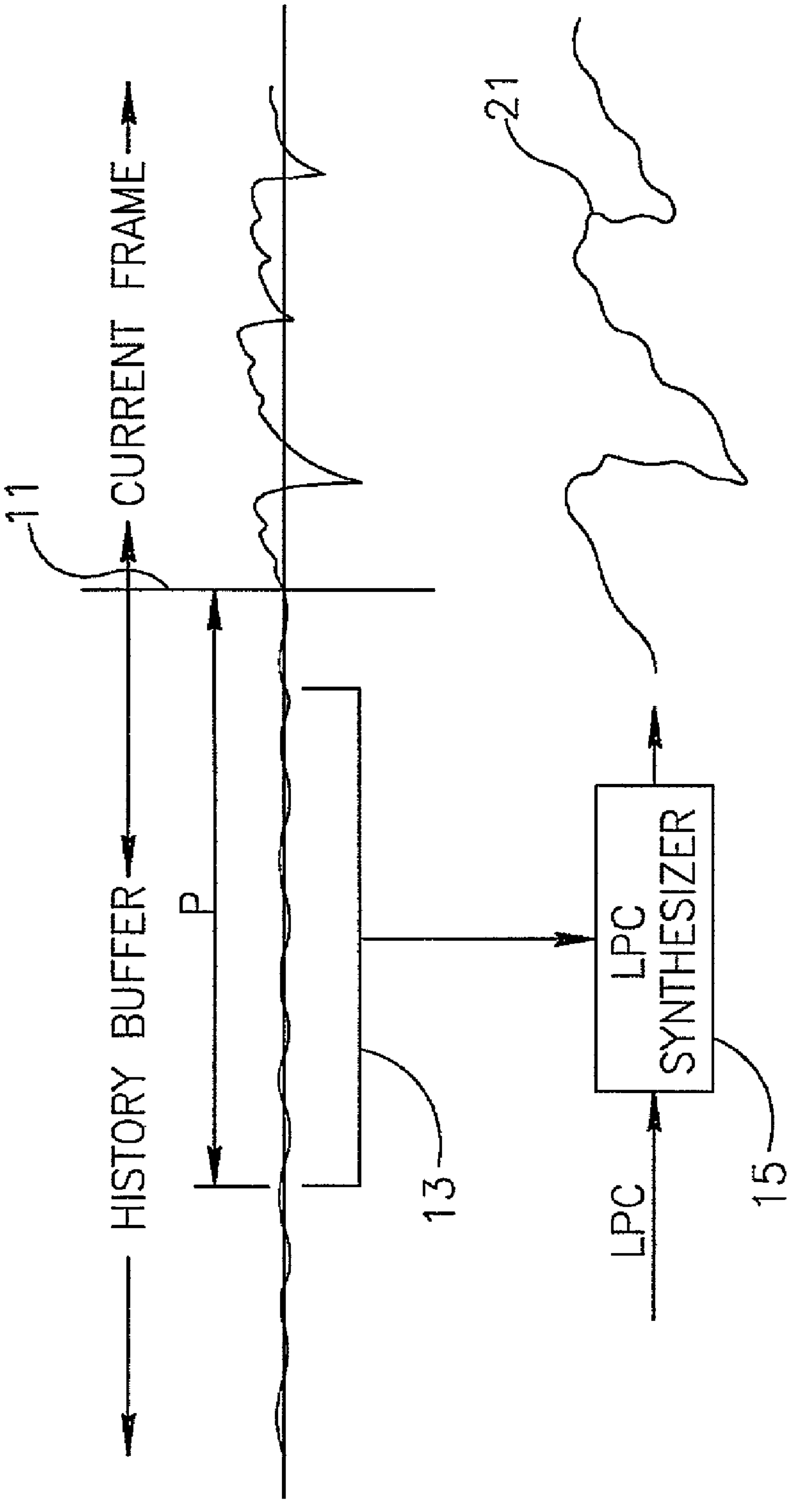
FIG.1B PRIOR ART
Figure 1C:
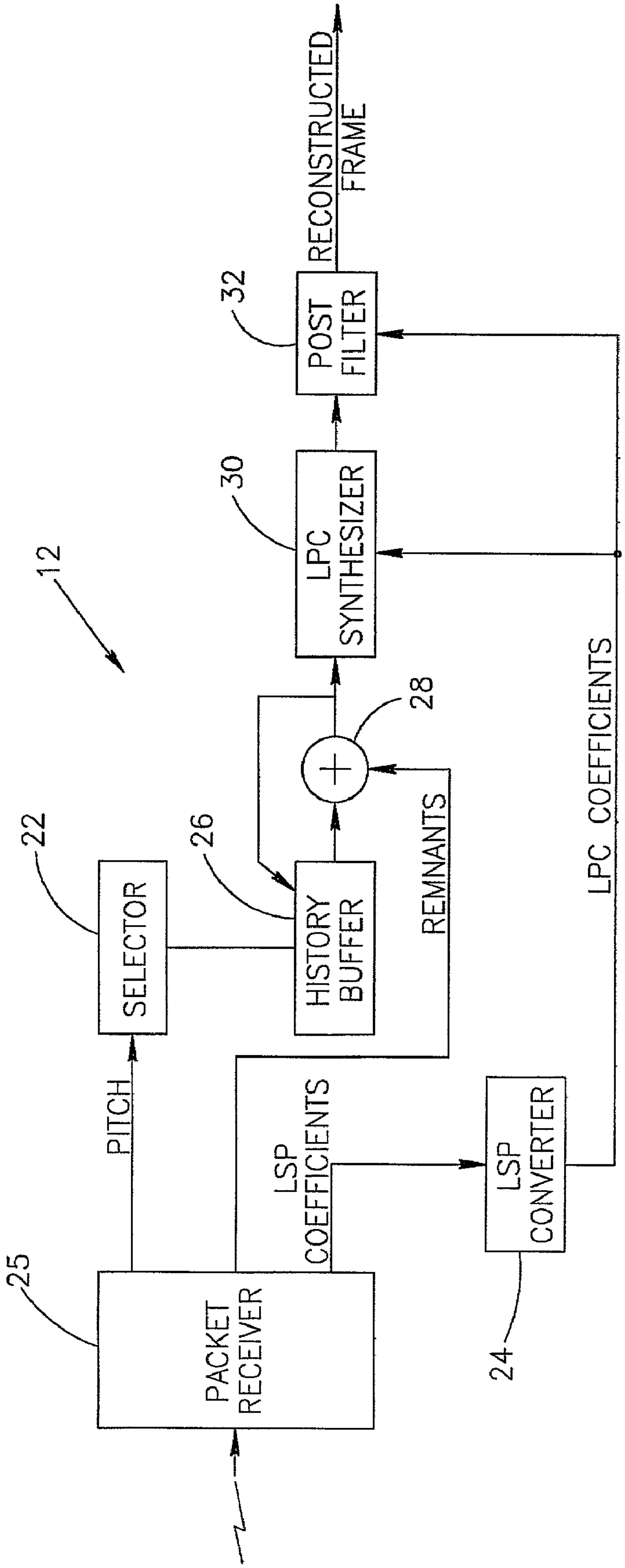
FIG.1C PRIOR ART

Encoder 10' processes current frame 40 as in prior art encoder 10. Accordingly, encoder 10' includes a short term analyzer and encoder, such as LPC processor 14 and LPC converter 25, a long term analyzer, such as pitch processor 16, history buffer 18, remnant excitation processor 20 and packet creator 17. Encoder 10' operates as described hereinabove with respect to FIG. 1B, determining the LPC coefficients, $LPC_C$, pitch $P_C$ and remnants for the current frame and providing the residual signal to the history buffer 18.

Packet creator 17 combines the LSP, pitch and remnant data and, in accordance with a preferred embodiment of the present invention, creates current frame portion 54 of the allotted size. The remaining bits of the packet will hold the future frame portion 56.

To create future frame portion 56 for this embodiment, encoder 10' additionally includes an LSP converter 60, a multiplier 62 and a pitch change processor 64 which operate to provide an indication of the change in pitch which is present in future frame 42.

Encoder 10' assumes that the spectral shape of lookahead portion 50 (FIG. 2), is almost the same as that in current frame 40. Thus, multiplier 62 multiplies the LSP coefficients $LSP_C$ of current frame 40 by a constant α, where α is close to 1, thereby creating the LSP coefficients $LSP_L$ of lookahead portion 50. LSP converter 61 converts the $LSP_L$ coefficients to $LPC_L$ coefficients.

Encoder 10' then assumes that the pitch of lookahead portion 50 is close to the pitch of current frame 40. Thus, pitch change processor 64 extends or shrinks the pitch value $P_C$ of current frame 40 by a few samples in each direction where the maximal shift s depends on the number of bits N available for future frame portion 56 of packet 52. Thus, maximal shift s is: $2^{N-1}$ samples.

As shown in FIG. 5, pitch change processor 64 retrieves windows 65 starting at the sample which is $P_C$+s samples from an input end (indicated by line 68) of the history buffer 18. It is noted that the history buffer already includes the residual signal for current frame 40. In this embodiment, pitch change processor 64 provides each window 65 to an LPC synthesizer 69 which synthesizes the residual signal associated with the window 65 by utilizing the LPCL coefficients of the lookahead portion 50. Synthesizer 69 does not include a format perceptual weighting filter.

As with pitch processor 16, pitch change processor 64 compares the synthesized signal to the lookahead portion 50 and the selected pitch $P_C$+s is the one which best matches the lookahead portion 50. Packet creator 17 then includes the bit value of s in packet 52 as future frame portion 56.

If lookahead portion 50 is part of an unvoiced frame, then the quality of the matches will be low. Encoder 10' can include a threshold level which defines the minimal match quality. If none of the matches is greater than the threshold level, then the future frame is declared an unvoiced frame. Accordingly, packet creator 17 provides a bit value for the future frame portion 56 which is out of the range of s. For example, if s has the values of −2, −1, 0, 1 or 2 and future frame portion 56 is three bits wide, then there are three bit combinations which are not used for the value of s. One or more of these combinations can be defined as an "unvoiced flag".

When future frame 42 is an unvoiced frame, encoder 10' does not add anything into history buffer 18.

In this embodiment (as shown in FIG. 4B), decoder 12' has two extra elements, a summer 70 and a multiplier 72. For decoding current frame 40, decoder 12' includes packet receiver 25, selector 22, LSP converter 24, history buffer 26, summer 28, LPC synthesizer 30 and post-filter 32. Elements 22, 24, 26, 28, 30 and 32 operate as described hereinabove on the LPC coefficients $LPC_C$, current frame pitch $P_C$, and the remnant excitation signal of the current frame, thereby to create the reconstructed current frame signal. The latter operation is marked with solid lines.

Decoding future frame 42, indicated with dashed lines, only occurs if packet receiver 25 determines that the next packet has been improperly received. If the pitch change value s is the unvoiced flag value, packet receiver 25 randomly selects a pitch value $P_R$. Otherwise, summer 70 adds the pitch change value s to the current pitch value $P_C$ to create the pitch value $P_L$ of the lost frame. Selector 22 then selects the data of history buffer 26 beginning at the $P_L$ sample (or at the $P_R$ sample for an unvoiced frame) and provides the selected data both to the LPC synthesizer 30 and back into the history buffer 26.

Multiplier 72 multiplies the LSP coefficients $LSP_C$ of the current frame by a (which has the same value as in encoder 10') and LSP converter 24 converts the resultant $LSP_L$ coefficients to create the LPC coefficients $LPC_L$ of the lookahead portion. The latter are provided to both LPC synthesizer 30 and post-filter 32. Using the LPC coefficients $LPC_L$, LPC synthesizer 30 operates on the output of history buffer 26 and post-filter 32 operates on the output of LPC synthesizer 30. The result is an approximate reconstruction of the improperly received frame.

It will be appreciated that the present invention is not limited by what has been described hereinabove and that numerous modifications, all of which fall within the scope of the present invention, exist. For example, while the present invention has been described with respect to transmitting pitch change information, it also incorporates creating a future frame portion 56 describing other parts of the data, such as the remnant signal etc. in addition to or instead of describing the pitch change.

It will be appreciated by persons skilled in the art that the present invention is not limited by what has been particularly shown and described herein above. Rather the scope of the invention is defined by the claims which follow:

What is claimed is:

1. A voice encoder comprising:

an encoder for partially encoding future data into partially encoded future data, and for encoding a current frame into an encoded current frame; and a packet creator for creating a packet from said encoded current frame and said partially encoded future data, wherein said encoder comprises a pitch change processor for determining a pitch in said future data as a change over a current pitch of said current frame, and wherein said pitch change processor comprises a voiced/unvoiced state determiner for determining a voice/unvoiced state based on the quality of the pitch change determination.

2. A method for encoding voice signals, the method comprising:

dividing a voice signal into fames;

encoding a first frame of said divided voice signal;

partially encoding a second frame of said divided voice signal, said second frame being subsequent in time to said first frame; and creating a packet comprising said encoded first frame and said partially encoded second frame, wherein said partial encoding of said second frame includes determining a pitch in a section of said second frame as a change over a current pitch of said first frame, and wherein determining comprises determining a voiced/unvoiced state based on the quality of the pitch change determination, and wherein the method is performed by a voice encoder, the voice encoder comprising an encoder and a packet creator.

3. A voice encoder comprising:

an encoder operative to encode a first frame of voice data;

a pitch change processor operative to determine a pitch in lookahead data used for LPC encoding of a second frame of voice data subsequent in time to said first frame, said pitch determined as a change over a pitch of said first frame; and a packet creator operative to create a packet from the encoded first frame and said pitch in the lookahead data, wherein said pitch change processor comprises a voiced/unvoiced state determiner operative to determine a voice/unvoiced state based on the quality of the pitch change determination.

* * * * *